Jan. 21, 1936. W. H. DALRYMPLE 2,028,440
TIRE SPREADER
Filed Sept. 25, 1935
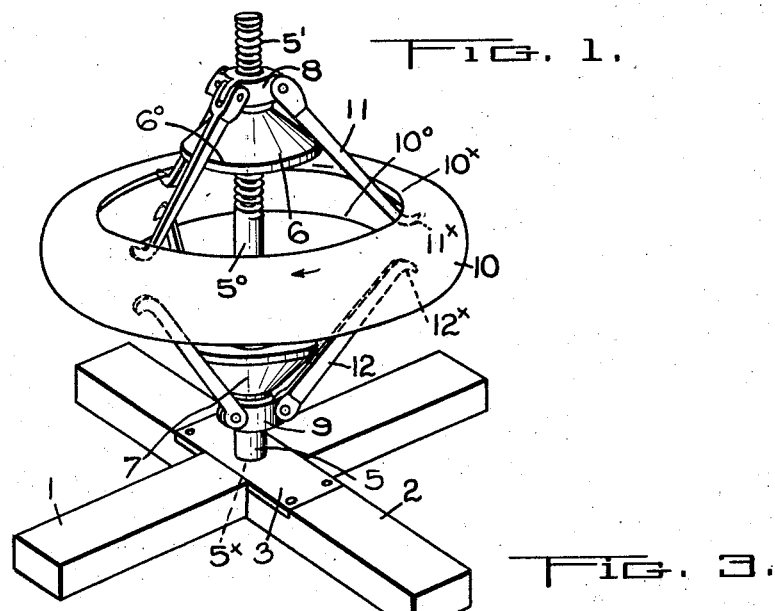
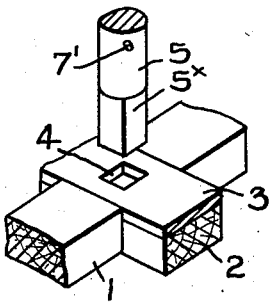
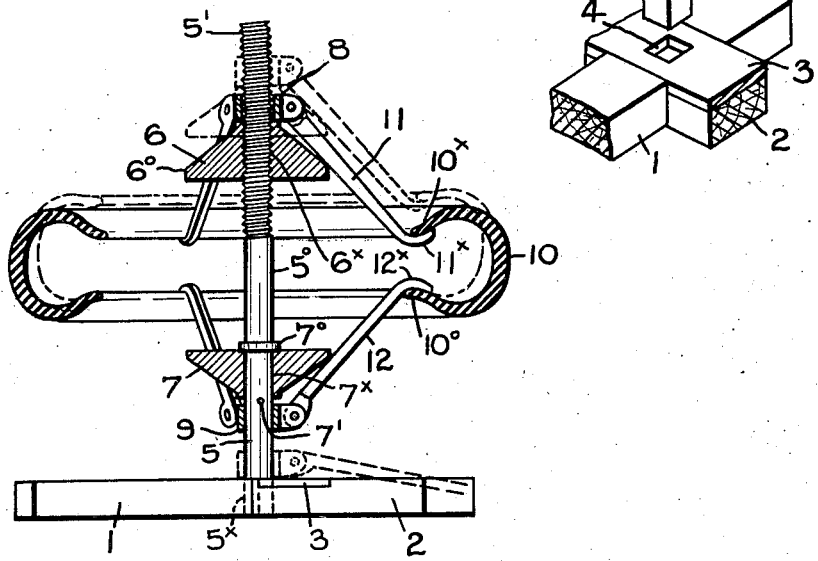
Inventor
W. H. DALRYMPLE
By Fetherstonhaugh & Co.
Attorneys Patented Jan. 21, 1936

2,028,440

UNITED STATES PATENT OFFICE 2,028,440

TIRE SPREADER

William Henry Dalrymple, Brucefield, Ontario, Canada

Application September 25, 1935, Serial No. 42,150
In Canada May 9, 1935

4 Claims. (Cl. 154—9)

My invention relates to improvements in tire spreaders, and the object of the invention is to devise a simple, easily operable and quick device for spreading the annular lips of a tire casing apart simultaneously at all points to allow of the easy insertion of a tube or of the repair of the interior of the casing, and it consists essentially of the arrangement and construction of parts as hereinafter more particularly explained.

Fig. 1 is a perspective view of my spreader and a tire casing applied thereto.

Fig. 2 is a sectional view through the spreader and tire casing.

Fig. 3 is a perspective detail of the engaging portions of the base and centre stem separated apart.

In the drawing like characters of reference indicate corresponding parts in each figure.

1 and 2 are crossed members secured together to form a base upon which the spreading mechanism is centrally supported. The members 1 and 2 are preferably provided with a metal tie plate 3 having a rectangular orifice 4, such orifice being continued down through the crossed portions of the members 1 and 2.

5 is a centre stem having a squared lower end $5^x$ fitting the orifice 4, a central smooth cylindrical portion $5^0$, and an upper threaded portion $5^1$.

6 and 7 are spreader members substantially of cone frustum shape. The member 6 is provided with an internally threaded centre orifice $6^x$ engaging the threaded portion $5'$ of the stem 5. The member 7 is provided with an unthreaded centre orifice $7^x$ so as to freely rotate around the stem 5 without longitudinal movement, being held from such longitudinal movement between a collar $7^0$ welded to the shaft or other means for forming a shoulder engaging the upper end of the member 7 and a pin $7^1$ or other holding means projecting from the shaft directly beneath the member 7.

8 and 9 are collars mounted on the stem 5 to have free longitudinal movement thereon. The upper collar 8 normally rests upon the member 6 and the lower collar 9 on the plate 3. 10 is a tire casing provided with the usual edge lips $10^x$ and $10^0$. 11 are fingers pivotally mounted upon the collar 8 and depending therefrom so as to rest on the outer peripheral edge $6^0$ of the spreader member 6. The lower extremities of the fingers 11 are turned up into hook form at $11^x$ suitable for engaging the upper lip $10^x$ of the tire casing 10. 12 are fingers pivotally mounted on the collar 9 and provided with downturned outer extremities $12^x$ suitable for engaging the lower lip $10^0$ of the tire casing.

In order to place the tire casing in position for spreading, the collar 8 and the fingers 11 carried thereby are raised. The collar 8 is thereby carried away from the member 6 and the finger extremities $11^x$ drawn inward towards the stem 5. The casing 10 is then passed vertically downward, to the position shown in the drawing, over the stem 5 so that the finger ends $11^x$ pass the lip $10^0$ of the tire casing. The collar 8 is then released so that the finger ends $11^x$ are carried outward to engage beneath the lip $10^x$ to support the tire casing.

If the tire casing is of smaller internal diameter, the collars 8 and 9 will not be brought into engagement with the members 6 and 7 as shown in the drawing when the spreading operation is performed.

The fingers 12 are then swung upward from their dotted position so that their ends $12^x$ pass above the lip $10^0$. The collar 9 is then raised to carry the finger ends $12^x$ outward to engage the lower lip $10^0$ in the position shown in the drawing. The parts are so adjusted that when placed in the above position the fingers 11 and 12 assume the same angular position in relation to the stem 5.

The tire casing 10 is then spun manually in the direction of arrow carrying the fingers 11 in the same direction. The fingers 11 are forced into frictional contact with the outer peripheral edge $6^0$ of the member 6 so that the fingers 11, member 6 and collar 8 rotate as one unit. The member 6 is simultaneously carried upward longitudinally of the stem 5 by the threaded portion $5^1$ with which it engages lifting the collar 8 and fingers 11 in the same direction.

By the upward movement of the member 6 a pull is exerted on the collar 9 and fingers 12 through the tire casing intervening between the fingers 11 and 12 thereby pulling the casing lips $10^x$ and $10^0$ apart or into the dotted position shown in Fig. 2, thereby providing a wide annular mouth through which an inner tube may be easily inserted or interior repairs made.

As soon as these operations are performed, the tire casing may be released by rotating the tire casing in the opposite direction to arrow.

What I claim as my invention is:—

1. A tire casing spreader comprising means for separately engaging each lip of the tire casing, a threaded mounting for rotatably supporting the lip engaging means, and means operated by the thread of the mounting for automatically carrying the lip engaging means and lips apart as the tire is rotated around the mounting.

2. A tire casing spreader comprising a stem forming a central mounting and having a threaded portion, upper and lower collars surrounding the stem, a plurality of fingers pivoted to each collar and extending into engagement at their opposite ends with the inner faces of the tire casing lips, means for simultaneously adjusting the upper and lower fingers to their outward spread position into engagement respectively with the upper and lower lips of the casing, and means operated by the rotation of the casing and coacting with the aforesaid thread for increasing the distance between the upper and lower fingers.

3. A tire casing spreader comprising a stem mounted at one end on a suitable support and having a threaded portion, means on the stem for anchoring the lower lip of the casing from movement parallel with the stem and means for moving the upper lip away from the lower lip comprising a collar freely surrounding the threaded portion, fingers pivoted to the collar and having hook portions engaging beneath the upper lip of the tire casing, and a member engaging the thread of the stem and forming an annular edge on which the fingers rest.

4. A tire spreader comprising a base, a stud extending upward therefrom, upper and lower collars surrounding the stud, a plurality of arms pivoted to each collar and having lip engaging means at their outer end, means operated by the rotation of the tire around the stud for carrying the collars apart, and conical members on the stud for maintaining the arms in a tire engaging position during the spreading operation.

WILLIAM HENRY DALRYMPLE.